Sept. 8, 1970     I. L. STERN ETAL     3,526,948
CIRCULAR FILLET WELDABILITY TEST
Filed Dec. 15, 1967
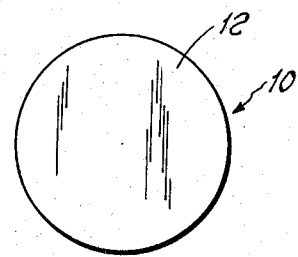
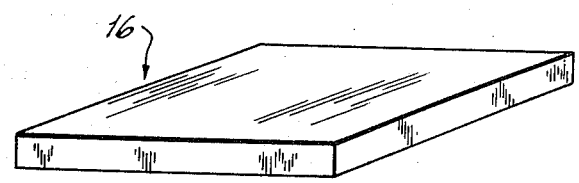
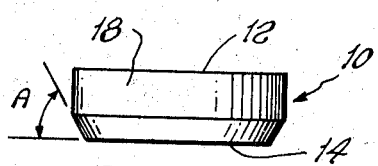
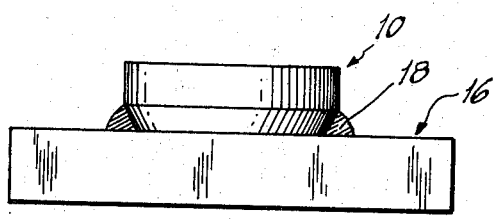
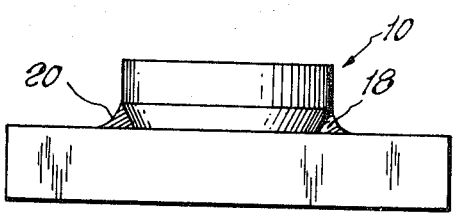
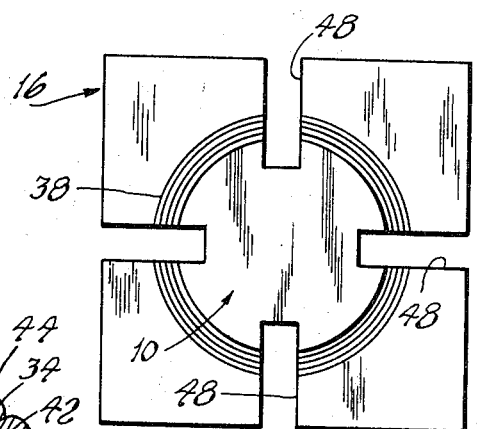
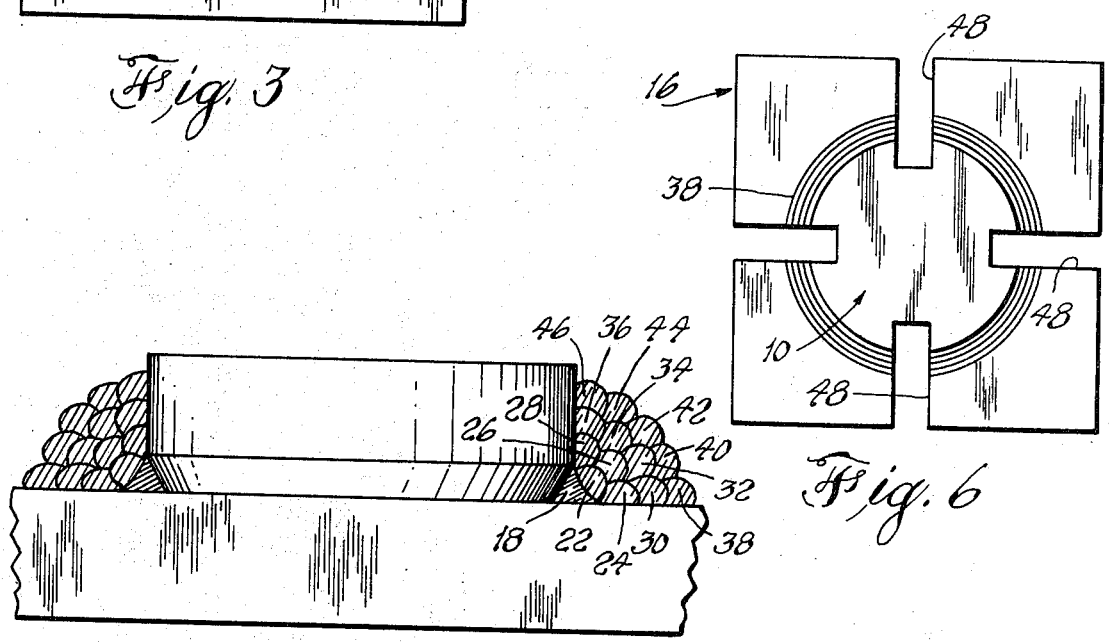
INVENTORS.
IRVING L. STERN
ROBERT F. QUATTRONE
BY Philip Schneider
ATTORNEYS United States Patent Office 3,526,948
Patented Sept. 8, 1970

3,526,948
CIRCULAR FILLET WELDABILITY TEST
Irving L. Stern, Brooklyn, and Robert F. Quattrone, Staten Island, N.Y., assignors to the United States of America as represented by the Secretary of the Navy
Filed Dec. 15, 1967, Ser. No. 690,811
Int. Cl. B23q *17/00*
U.S. Cl. 29—407
10 Claims

ABSTRACT OF THE DISCLOSURE

Means for testing weldability of various base-metal/filler-metal combinations under heavy self-restraint and of the merit of various welding procedures. The base metal is formed into a plate and a smaller circular disc having two flat surfaces connected by a circular surface. One circumferential boundary of the circular surface and a flat surface is inwardly chamfered. The disc is placed in the center of the plate with the flat, chamfered surface in contact with the plate. A continuous circumferential bead of filler material is deposited in the chamfer space and concavely machined after it cools. Other circumferential beads are deposited in layers, subsequent layers being laid down after the prior layer cools. The cracks which develop in each layer are recorded. After approximately five layers are laid down, the weld is allowed to cool for a week and is examined daily for cracking. After a week has elapsed, the weldment is macrosectioned and examined under magnification for cracking.

The invention described herein may be manufactured and used by or for the Government of the United States of America for governmental purposes without the payment of any royalties thereon or therefor.

This invention relates to a method and means for testing the weldability of any given base-metal/filler-metal combination and especially to the testing of welds by means of circular-fillet weld deposits which indicate the susceptibility of the welds to hot and cold cracking under conditions of restraint. The effects of different welding processes can also be evaluated.

One of the important criteria for estimating the suitability of new steels and filler metals for ship construction and repair is their weldability. Large, complex structures, which are required in ship construction, often involve highly restrained, thick sections, which must withstand severe service. Considerable time, money and manpower must be expended to develop a technology for a new base-plate/filler-metal system before it can be successfully used in welded structures. It is, therefore, highly desirable to be able to predict, at an early stage, the problem areas which will be encountered and the degree of success which can be expected with a proposed base-metal/filler-metal combination.

The two principal areas of concern in welded construction are usability and weldment cracking. Usability is associated with parameters such as equipment, welding techniques, procedures and processes, and metal transfer characteristics. Most of these problems are resolved in the course of development of a material fabrication technology as it evolves from the laboratory to its final application. Weldment cracking, however, presents a more complicated problem, involving the interaction of many complex factors inherent in a particular base-metal/filler-metal combination and the conditions under which it is used. Since cracking tendency will eventually determine the role of a particular material system in planned applications, a means of measuring this tendency at an early stage of development of a material system and the determination of the factors which influence cracking can minimize or eliminate cracking problems in final field construction.

Accordingly, an object of this invention is to provide a method and means for checking the merit of a weld utilizing any given base-metal/filler-metal combination.

Another object is to provide a weldability test which enables the prediction of the tendency to crack of welds utilizing any given base-metal/filler-metal combination.

A further object is to provide a method and means for checking the merit of welds of highly restrained, thick sections of metal.

Yet another object is to provide a weldability test which indicates heat-affected-zone and weld-deposit cracking, both hot and cold, and will do so for large-scale weldments.

Still another object is to provide a weldability test which permits the evaluation of different welding procedures.

The objects and advantages of the present invention are realized by welding the junction between a heavy base plate and a heavy circular disc, the weldment comprising successive layers of circumferential weld beads. A predetermined amount of time is allowed for each layer to cool and each is examined for cracks before the next layer is deposited. The amount of cracking which occurs is a measure of the merit of the particular combination of base and filler metals which is used.

Other objects and advantages will appear from the following description of an example of the invention, and the novel features will be particularly pointed out in the appended claims.

In the accompanying drawings:

FIG. 1 is a schematic showing of the chamfered disc, FIG. 1A being a top view and FIG. 1B being a side view;

FIG. 2 is an isometric illustration of the plate;

FIG. 3 is a side view showing the disc in position on the top surface of the plate after a tie-down weld has been made;

FIG. 4 is a side view showing how the tie-down weld is machined;

FIG. 5 is a side view showing four layers of fillet welds between the disc and the plate; and FIG. 6 is a top view showing how the weldment is macrosectioned.

The circular fillet weldability test was developed to predict the hot and cold cracking tendency of weld deposit and base metal as well as the relative merits of different welding procedures, such as welding done in different gaseous atmospheres. What is done is to compare the weldment to be checked with a standard weldment prepared according to the steps to be described subsequently. The standard weldment utilizes standard materials (base plate and filler) whose performance in ship construction is known and considered to be good. A specimen consisting of two plates, one smaller than the other, but both being of sufficient size to provide a condition of heavy restraint during the welding process, is constructed from the standard material and the plates are welded together with the standard filler material utilizing the circular fillet welding technique.

The number of heat-affected-zone (HAZ) and/or weld cracks which develop is noted and recorded. The same thing is done for other base metal/filler metal combinations and welding processes which are to be tested and the results are compared to those obtained with the standard.

The specimen thickness is established by determining the condition which will produce moderate cracking in a standard specimen. For HY–80 ship-construction steel and MIL–11018 covered electrodes, it was found that two-inch-thick members of HY–80 steel produced the level of cracking desired for the standard specimen at the temperatures employed (between 70 and 120° F., approximately).

FIGS. 1 and 2 show the two parts of the specimen which is to be welded together. These parts are a circular disc 10 with flat upper and lower surfaces 12 and 14 and a square plate 16. As seen from the top, the disc 10 is circular. One edge of the circumferential surface 18 is inwardly chamfered. Typical dimensions for the plate 16 were 12 x 12 x 2 inches and for the disc 10 were 6½ inch diameter by 2 inch thickness. The chamfer was sixty degrees. This angle depends on the thickness of the electrode used in laying down the weld bead.

A chamfer is used because the variability of the juncture between an unchamfered disc and the plate would cause cracking in the first welding bead. By using a chamfer, a tie-down weld can be used; the tie-down weld can be machined and any cracks in it can be repaired so that the test can start from an initially smooth surface between disc and plate.

The circular shape of the disc and the square shape of the plate, as illustrated in the drawing, are not necessary but are preferable because they provide symmetry. All that is essential is that the members be large enough to provide heavy restraint and room enough for the bulky fillet weld. Note that as used herein, "fillet" refers to the entire weld, that is, all the layers of beads which make or are used in the complete weld.

"Heavy restraint" is a condition known to the welding art and is a condition which prevents the ends of the square plate from being bowed upward by contraction of the weld material as it cools. The size of the plate which provides enough weight to prevent this can be determined by trial or by experience in the welding field.

In FIG. 3, the disc 10 is shown in welding position on top of the plate 16. A tie-down weld consisting of a circumferential bead 18 lying in the angle between the chamfer and the top surface of the plate 16 is made to fasten the disc and plate together. Any cracks which appear in the weld as it cools are repaired.

The tie-down weld is machined after cooling so that it presents a smooth concave surface, the curve having a radius of about 3/16 inch. The machining provides a uniform surface all for test specimens, all tie-down beads having the same curve and circumferential length after the machining. The concave surface 20 of the machined tie-down weld bead 18 is shown in FIG. 4.

The weldability test involves the building up of layers of weld deposit beads and four layers of beads are illustrated in FIG. 5. The first layer consists of one bead 22. The second layer consists of three beads; the bottom bead 24 is laid down first, the disc bead 28 is laid down next and, lastly, the tempering bead 26 is laid down. In general, any bead laid down upon another tempers the latter which is termed the tempered bead, the former being called the tempering bead. The tempering process relieves some stress set up by the welding process. However, in this description, only the last bead in a layer will be termed the tempering bead.

The third layer consists of four beads. The first to be laid down is the plate bead 30, then intermediate bead 32, then disc bead 36 and then tempering bead 34.

The fourth layer consists of five beads: first to be laid down is the plate bead 38, then intermediate bead 40, next intermediate bead 42, then disc bead 46 and finally tempering bead 44.

Thus, it can be seen that for each layer, except the first, the number of beads in the layer is one more than the number of the layer itself. Thus, the fourth layer has five beads. The number of beads in a layer depends on the thickness of the beads and therefore on the thickness of the welding electrode. The specific numbers given herein are valid for MIL–11018 electrodes.

The number of layers which is used is usually about five or six, since this amount of weld deposit has been found to provide a severe test for the standard specimen; it is considered to provide as severe a condition as encountered in heavy ship welding, for example, with the HY–80 steel and MIL–11018 electrodes.

The steps in the weldability test are listed below:

(1) Remove all grease and oil from the disc and plate.

(2) Center the disc on the plate with the chamfered surface in contact with the plate. Deposit the tie-down weld. Repair any cracks which appear as the weld cools off.

(3) When weld has cooled, machine the weld.

(4) Using suitable nondestructive testing techniques, such as magnetic particle inspection, examine weld for cracks. Repair cracks and machine again, if necessary.

(5) Remove grease and oil.

(6) Deposit weld layers using the following procedures and conditions:

Welding sequence—continuous circumferential fillets.
Bead sequence—Tempering Bead Technique, starting with lowest (plate) bead and building up beads thereupon, ending with the tempering bead and laying down the disc bead just prior to the tempering bead. The first layer consist of one bead; all other layers consists of $L+1$ beads, where L is the number of the layer counting outward from the tie-down weld.
Preheat temperature—ambient.
Interpass temperature—120° F., maximum.
Interlayer time—one layer per day.

(7) After completion of each layer, allow the assembly to cool to room temperature in still air.

(8) Examine each weld layer for weld and toe cracks, using suitable nondestructive testing techniques, periodically and immediately before deposition of the subsequent layer. Record initial and delayed crack indications.

(9) Repeat steps (6), (7) and (8) until five weld layers have been completed.

(10) Allow completed assembly to remain at room temperature for one week. Examine daily for delayed cracking.

(11) Machine four equally spaced macrosections 48 (see FIG. 6) from the completed weldment and examine for cracks under magnification (at least 25× magnification is preferred because this strength is the lower limit for permitting observation of microcracks).

The temperature to which each layer is cooled determines the stress which is applied to the weld. However, the longer the cooling periods, the lengthier the test becomes. A practical compromise is to allow each layer to cool to room temperature and stand for a day and the completed weldment is to cool to room temperature and stand for a week.

Thus, the weldability test employs a relatively large, self-restrained specimen in which heavy restraint, typical of that encountered in large construction like ship construction or repair work, develops high residual stresses. Stress increases with the number of layers of filler metal which are deposited. The test indicates susceptibility of the weld metal and the base-plate heat-affected zone to hot and cold cracking under conditions of heavy restraint and can be used to test the merits of different welding procedures.

Important features of the test are:

(1) The specimen uses sufficient amounts of filler metal and base plate to detect variations within materials and processes.

(2) The size is adequate to minimize differences in cooling rates in the course of welding any single bead.

(3) Full plate thickness can be tested for ship welding work.

(4) Rapid evaluation can be made on the basis of surface cracking for weld metal/base metal systems which exhibit a high cracking tendency.

(5) Weld deposit and heat-affected zone are tested simultaneously.

(6) The test is capable of demonstrating delayed cracking.

The ability of the test to indicate weld and HAZ delayed cracking was demonstrated in actual tests by the following:

(1) Some specimens which were crack-free after cooling to room temperature exhibited HAZ or weld surface cracks the following day.

(2) HAZ and weld cracks detected by magnetic particle inspection during welding were observed to increase in length and/or number during the time interval between layers.

(3) A specimen welded with extended time interval between layers exhibited no cracking three days after deposition of the second layer, but did exhibit eight fine HAZ cracks after seven days.

(4) Macrosections have shown HAZ cracks in layers in which cracking had not been observed by surface inspection. Some of these cracks were of a magnitude which would have been revealed by magnetic particle inspection prior to welding of the subsequent layer if they had existed at the time of inspection.

In addition to the delayed cracks noted above, macrosectioning of specimens revealed two types of longitudinal weld cracking (fine and gross) which had not been observed on surface inspection. The fine cracks were believed to be cold cracks associated with element additions from the base plate. Gross craks were classified as hot cracks on the basis of an electron probe analysis which indicated an exceptionally high copper content on the crack surface.

Evaluation is based upon comparison with results obtained with weld-metal/base-metal combinations for which fabrication experience exists. Layer at which cracking first occurs as well as type, quantity and size of cracks are considered in the evaluation.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A method for testing the susceptibility of welds to hot and cold cracking under conditions of heavy restraint comprising the steps of:

forming a plate from a metal which is to be used as a base, the weight of said plate providing heavy self-restraint;

forming a second plate from the same base metal, said second plate being smaller in area than the first plate;

placing the second plate flatly against a surface of the first plate in its central area;

depositing a circumferential tie-down weld at the junction of said two plates;

repairing any cracks which appear upon cooling of the tie-down weld;

depositing a first layer of circumferential weld beads over the tie-down weld;

cooling the weldment to a predetermined temperature for a predetermined time and recording any cracks which appear;

depositing a predetermined number of additional layers of circumferential weld beads over the prior layers, allowing each to cool to a predetermined temperature for a predetermined time, and recording the cracks which appear in each layer;

cooling the completed weldment to a predetermined temperature and allowing it to stand for a predetermined period of time, counting the cracks which appear at selected intervals and recording the results;

at the end of the predetermined period of time, taking at least one macrosection of the weldment and examining it under magnification for cracks; and comparing the results with the results obtained from a standard specimen comprising a weldment specimen prepared in the same way from standard materials.

2. A method as in claim 1, in which:

said second plate is formed with a surface which is chamfered along its edges;

said chamfered surface being placed in contact with a surface of said first plate and said tie-down weld being laid down in the chamfer angle between the two plates.

3. A method as in claim 2, comprising the further steps of:

matching said tie-down weld after repairing the cracks therein so that the surface is curved concavely; and repairing any cracks that appear after machining and remachining, if necessary.

4. A method as in claim 3, in which the weld layers are formed in accordance with the Tempering Bead Technique.

5. A method as in claim 3, in which the magnification is at least 25 times.

6. A method as in claim 3, in which the said first plate is a square plate and said second plate is a circular disc which is chambered along one circumferential edge.

7. A method for testing the susceptibility of welds to hot and cold cracking under conditions of heavy restraint comprising the steps of:

forming a square plate from a metal which is to be used as a base, the weight of said plate providing heavy self-restraint;

forming a circular disc from the same base metal, the disc being chamfered along one circumferential edge;

placing the disc on one of the larger surfaces of said plate in the central area, the chamfered surface of the disc being in contact with the plate surface;

depositing a circumferential bead tie-down weld in the recess formed by the plate surface and the chamfered surface of said disc;

repairing any cracks which appear as the tie-down weld cools;

after the tie-down weld has cooled, machining the weld so that its surface is curved concavely;

repairing any cracks that appear in the tie-down weld after machining, and remachining, if necessary;

depositing a first weld layer, a single circumferential bead on the plate next to and in contact with the tie-down weld;

cooling the weldment to a predetermined temperature for a predetermined length of time and recording any cracks which appear;

depositing a second weld layer;

repeating the steps of allowing the layer to cool, examining the layer for cracks, recording the cracks and depositing a subsequent layer for a desired number of layers;

cooling the completed weldment and allowing it to stand for a predetermined period of time, counting the cracks which appear each day and recording the number of cracks;

at the end of the predetermined period of time during which the completed weldment is allowed to stand, making at least one macrosection of the weldment and examining the macrosection under magnification for microcracks; and comparing the results obtained with the results obtained with a standard specimen weldment.

8. A method as in claim 7, wherein:
said weld layers are deposited in accordance with the Tempering Bead Technique.

9. A method as in claim 8, wherein:
each successive weld layer and the completed weldment are cooled to room temperature, the length of time each layer is cooled before counting cracks therein is one day, the period of time the completed weldment is allowed to stand is one week, and the standard specimen is formed from base metal of HY–80 steel and filler metal from MIL–11018 covered electrodes.

10. A method as in claim 9, wherein:
the first layer consists of a single circumferential bead and each succeeding layer consists of a number of beads equal to $L+1$, where L is the number of the layer counting outward from the tie-down weld;
the total number of layers in the weldment being at least five in number.

References Cited

UNITED STATES PATENTS 2,819,517    1/1958    Pursell _____ 29—487 X

FOREIGN PATENTS 201,689    3/1939    France.

OTHER REFERENCES

Welding Handbook, 1942, published by American Welding Society, pp. 1073 and 1078.

Stout and Doty, Weldability of Steels, 1953, pp. 224–242.

JOHN F. CAMPBELL, Primary Examiner

R. J. SHORE, Assistant Examiner

U.S. Cl. X.R.

29—487, 497